United States Patent Office 3,306,707
Patented Feb. 28, 1967

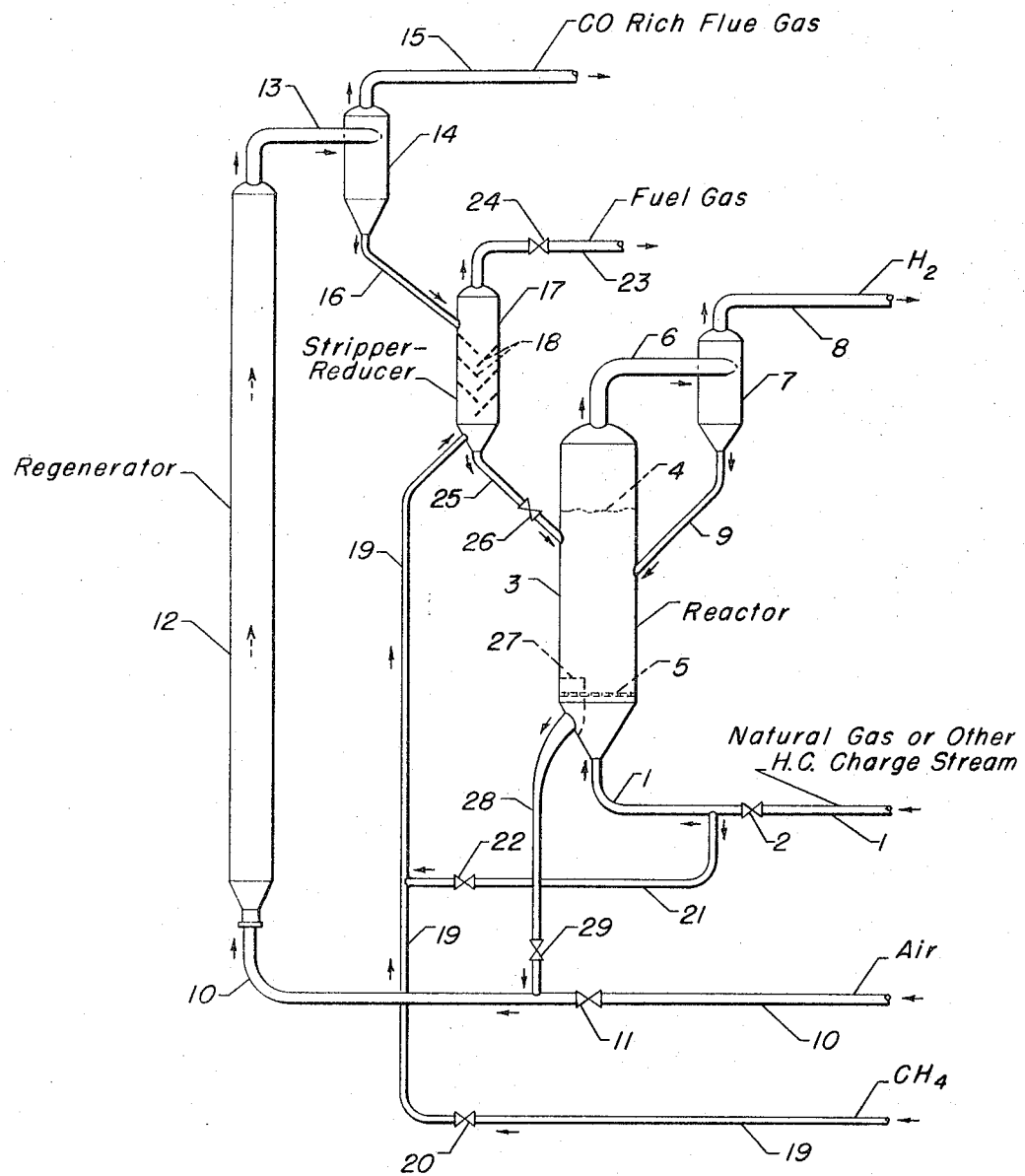

3,306,707
HYDROGEN PRODUCING SYSTEM WITH HYDROCARBON STRIPPING OF REGENERATED CATALYST
Leslie C. Hardison, Arlington Heights, Ill., assignor to Universal Oil Products Company, Des Plaines, Ill., a corporation of Delaware
Filed July 1, 1963, Ser. No. 291,610
2 Claims. (Cl. 23—212)

The present invention relates to the operation of a continuous hydrogen producing system wherein a light hydrocarbon stream is decomposed to hydrogen and carbon in the presence of subdivided catalyst particles. More particularly the present improved operation is directed to a stripping step which utilizes methane or other light hydrocarbon to preclude the transfer of carbon oxides and nitrogen into the reaction zone with the heated catalyst particles being transferred from the regeneration zone.

In effecting optimum yields of hydrogen of high purity from the fluidized or moving bed catalytic decomposition of a hydrocarbon stream at high temperatures, it has been found particularly advantageous to effect the stripping of the catalyst prior to its entry into the reaction zone to prevent the transfer of carbon oxides and nitrogen as well as to effect the reduction of the metal oxide catalyst such that it will not in turn cause the actual production of carbon monoxide during its catalytic contact with the charge stream. Hydrogen, being obtained as a portion of the hydrogen rich product stream, has been effectively used in various high temperature hydrogen producing systems where natural gas, methane or other low molecular weight hydrocarbon is decomposed into hydrogen and carbon. However, such use of hydrogen is expensive and takes away from the overall efficiency of the unit.

It is therefore a principal object of the present invention to utilize a method for stripping catalyst particles passing from the regeneration zone to the reaction zone with a gaseous hydrocarbon stream to improve the overall processing operation and product yield.

It is a further object of the invention to provide for the use of methane, or a portion of a light hydrocarbon charge stream, as a stripping medium for the hot regenerated catalyst particles, and to subsequently effect the withdrawal of the resulting gaseous stripping stream and entrained stripped products from the regenerator zone to provide a useful fuel gas stream which may be utilized for heating purposes in the refinery area or elsewhere.

In one embodiment, the present invention provides in a hydrogen producing system wherein a hydrocarbon charge stream is catalytically decomposed in a reaction zone to hydrogen and carbon in the presence of heated subdivided catalyst particles and resulting carbonized catalyst particles are passed from a reaction zone to a regeneration zone and contacted therein with an oxygen containing stream to provide for the burning of the carbon from the particles and the reheating thereof, the improved method of operation to prevent contamination of the hydrogen product stream and to provide a high hydrogen yield which comprises, passing the heated and reduced carbon content catalyst particles from the regeneration zone to a stripping zone and therein contacting them with a low molecular weight hydrocarbon stream to effect the stripping of entrained carbon oxides and nitrogen therefrom, and then introducing the resulting stripped, heated and reduced catalyst particles into the reaction zone for the high temperature decomposition of the hydrocarbon charge stream to hydrogen with a minimum of contamination.

It has been found in operating high temperature catalytic hydrocarbon decomposition systems to produce hydrogen and carbon that it is desirable to maintain the regeneration step under close control such that there is a high percentage of carbon monoxide as compared with carbon dioxide. In other words, the air or oxygen addition to the regeneration zone is regulated to minimize carbon dioxide formation; however, it appears that the metal oxide catalyst after being exposed to a high temperature operation with insufficient oxygen and incomplete carbon removal over a period of time tends to form a resistant type of carbon which deactivates or poisons the catalyst. The present system, with a separate controlled stripping-reducing step, permits the use of a slight excess of air over that required to burn the carbon to carbon monoxide within the regeneration zone. The presence of some carbon dioxide and the slight excess of air will result in some oxidation of the metal oxide activated catalyst which will have a tendency to produce carbon monoxide in the processing stage of the reaction zone, except for treatment of the catalyst particles by a stripping and reducing stream. Methane or other light hydrocarbon charge stream will serve to strip the catalyst of occluded carbon oxides and nitrogen, as well as effect the reduction of oxided catalyst prior to its entry into the catalyst zone. Natural gas may also be used as a stripping medium, or as a charge stream to the reactor unit, and shall be considered as a suitable low molecular weight hydrocarbon stream within the scope of the present invention.

Various refractory base catalysts may be used to effect the decomposition of a hydrocarbon stream at high temperatures to produce hydrogen and carbon, preferably one or more metals or metal oxides of Group VIII of the Periodic Table are utilized to provide optimum hydrogen formation. Thus, nickel, iron or cobalt compounds are advantageously used with a refractory base material. Refractory catalyst base materials which may be used are alumina, silica-alumina, silica-magnesia, and the like. In addition an oxide of zirconium, titanium, chromium, molybdenum, vanadium, etc., may be combined with one of the foregoing to provide a satisfactory base material. Also, in view of the catalytic effect necessary in the regeneration zone to control heat release and the carbon monoxide to carbon dioxide ratio gasifying carbon from the catalyst particles, the catalyst is necessarily of a type which resists oxidation by carbon dioxide and is readily reducible. The size of the catalyst particles will vary in accordance with the conversion system used, but for a fluidizide operation the particle size will generally be between 0.01 and 0.8 millimeter in diameter such that the particles may be readily fluidized and passed from one zone to another.

Fluidized or moving bed catalytic conversion systems for decomposing a light hydrocarbon stream, such as natural gas or methane, utilize substantially different operating conditions than those encountered in the catalytic cracking of gas-oil streams to produce improved gasoline yields. By way of contrast, the hydrocarbon stream is decomposed with no side reactions and at very high conversions per pass to produce hydrogen and carbon, even in the presence of a catalyst, at substantially higher temperatures than in catalytic cracking as, for example, above 1300° F. or more generally in the range of about 1500° F. to 2000° F. or higher.

Reference to the accompanying drawing and the following description thereof will serve to better set forth the improved stripping arrangement and flow system and the advantages obtained in connection therewith.

In the drawing it will be noted that a fluidized form of unit is indicated, with natural gas or other low molecular weight hydrocarbon charge stream, such as methane, ethane, propane, butane, etc., being charged by way of line 1 and valve 2 into the lower end of a reactor chamber 3. The gaseous charge stream effects the countercurrent fluidized contacting of subdivided catalyst in a bed 4 maintained in the lower portion of the reaction zone. Also, a suitable grid plate 5 may be utilized in the lower portion of the reactor 3 to assist in effecting the uniform distribution of the charge stream upwardly through the bed of fluidized catalyst particles therein. The catalyst is introduced into the upper portion of the reaction zone 3 at a high temperature above about 1400° F. whereby there may be a catalytic decomposition in accordance with the formula: $CH_4 \rightarrow 2H_2 + C$.

The resulting hydrogen rich product stream, with entrained catalyst particles, is passed overhead from reactor 3 by way of line 6 and particle separator 7 to outlet line 8. Recovered catalyst particles with carbon deposition are continuously withdrawn from the separator 7 by way of standpipe line 9 which in turn connects with reactor chamber 3 to return them to the bed 4. A continuous stream of carbonized catalyst particles is withdrawn from the reactor 3 by way of well 27, line 28 and control valve 29. Air in a controlled amount is introduced through line 10 and control valve 11 to transport the catalyst from line 28 into the lower end of a regenerator 12 so as to permit the oxidation and removal of the carbon deposit on the catalyst as well as to effect the reheating thereof to a high temperature whereby such heat may subsequently be utilized to effect the endothermic conversion and decomposition of the hydrocarbon charge stream in the reaction zone.

Generally in a continuous catalytic decomposition of a hydrocarbon charge stream, it is advisable to control the oxygen content or air stream being introduced to the regenerator 12 so as to in turn control the CO to $CO_2$ ratio so that there is no excessive carbon burning and no catalyst oxidation which will permit undue carbon oxide transfer to the reaction zone.

Incomplete oxidation and removal of the carbon can, however, be harmful to the process in that residual carbon consistently left on the catalyst particles will form a type which is of a resistant nature difficult to remove and will in effect lower the catalyst activity. Thus, in accordance with the present improved oxidizing and stripping system, it is possible to effect substantially complete removal of the carbon deposition on the catalyst particles in the regeneration zone by the utilization of air or oxygen in an amount which may be slightly in excess of that required to oxidize all of the carbon from the catalyst particles to form carbon monoxide. In other words, the subsequent reducing-stripping step permits the removal of objectional carbon oxides and a reduction of oxided catalyst to preclude the undesired formation of carbon monoxide in the reaction zone. The present diagrammatic embodiment indicates the regenerator 12 to be a vertically elongated chamber effecting the complete transfer of all of the catalyst particles and the regenerating gas stream overhead through line 13 to separator 14. A carbon monoxide rich flue gas stream is thus withdrawn overhead from separator 14 by way of line 15 while separated high temperature catalyst particles are withdrawn from separator 14 by line 16 which connect with the upper portion of a stripper-reducing chamber 17. The latter is indicated as having a plurality of spaced side-to-side plates 18 whereby the catalyst may move in a descending flow countercurrently with respect to a stripping stream introduced by way of line 19.

In accordance with the present invention, methane or other low molecular weight hydrocarbon is utilized as a stripping medium in chamber 17, with such medium being introduced into line 19 by way of control valve 20. In lieu of a separate feed stream, a portion of the natural gas charge or other low molecular weight hydrocarbon charge stream to the reactor 3, may be withdrawn from line 1 and passed by way of line 21 and control valve 22 into line 19 for introduction into the stripper 17. The overhead from the stripper is withdrawn by way of line 23 and valve 24 as a valuable fuel gas which may be utilized in heat producing equipment not shown.

High temperature stripped and reduced catalyst is removed from the lower end of the stripper 17 by way of transfer line 25 and control valve 26 to enter the upper portion of the reactor 3 for reuse in contacting the hydrocarbon charge stream. By virtue of the stripping and reducing step in chamber 17, the occluded carbon oxides are removed and carried overhead by way of line 23 together with nitrogen such that there is substantially no contamination of the resulting hydrogen product stream by reason of the catalytic decomposition in reactor 3. At the same time, the use of a separate confined stripping and reducing chamber 17 permits the controlled reduction of the catalyst therein such that there is substantially no problem appearing in the reactor 3 by virtue of any excessive exposure to oxygen in the regeneration zone 12 which would otherwise permit an oxided catalyst to pass to the reaction zone.

It may be pointed out that the present drawing is diagrammatic and that it is not intended to limit the improved stripping arrangement, or the processing apparatus, to only that which is shown. For example, there may be cocurrent or countercurrent flows in any one of the catalyst contacting zones together with variations in the utilization of particle transfer by gravity flow and fluidized lift procedures. Further, the catalyst may be utilized in a pellet form, rather than in a powdered or microspherical form, such that descending moving beds and gas lift type of operations are employed to effect the desired contacts and particle transfers.

One particular advantage obtained in the utilization of methane or other portions of the hydrocarbon charge stream to effect the stripping is the elimination of an additional compressor otherwise necessary to effect the introduction of the stripping medium into the stripper zone 17. In other words, where hydrogen stripping is utilized, and comprises a portion of the product stream, it is necessary to withdraw and compress such portion of the product stream to effect its charge to the stripper zone. In addition, the elimination of the hydrogen stripping provides for greater product yields and overall plant efficiency with respect to any given plant of fixed dimensions.

I claim as my invention:

1. In a hydrogen producing system wherein a hydrocarbon charge stream is catalytically decomposed in a reaction zone to hydrogen and carbon in the presence of heated subdivided catalyst particles and resulting carbonized catalyst particles are passed from the reaction zone to a regeneration zone and contacted therein with an oxygen containing stream to provide for the burning of the carbon from the particles and the reheating thereof, the improved method of operation to prevent contamination of the hydrogen product stream and to provide a high yield which comprises, passing the heated and reduced carbon content catalyst particles from the regeneration zone to a stripping zone and therein contacting them with a low molecular weight hydrocarbon stream to effect the stripping of entrained carbon oxides and nitrogen therefrom, withdrawing the stripped carbon oxides and nitrogen from the process to preclude transfer thereof to the reaction zone, and introducing the resulting stripped, heated and reduced catalyst particles into the reaction zone for the high temperature decomposition of the hydrocarbon charge stream to hydrogen with a minimum of contamination.

2. The process of claim 1 further characterized in that said low molecular weight hydrocarbon stripping gas stream comprises methane and the hydrocarbon decomposition reaction is carried out at a temperature above about 1300° F.

(References on following page)

References Cited by the Examiner

UNITED STATES PATENTS

| | | | |
|---|---|---|---|
| 2,609,345 | 9/1952 | Easly et al. | 252—419 |
| 2,852,443 | 9/1958 | Nathan | 252—419 X |
| 2,885,267 | 5/1959 | Buchmann et al. | 23—212 |
| 2,982,622 | 5/1961 | Jahnig et al. | 23—212 |
| 3,014,787 | 12/1961 | Peet | 23—212 X |
| 3,129,060 | 4/1964 | Pohlenz | 252—419 X |
| 3,216,801 | 11/1965 | Hoekstra | 23—212 |

FOREIGN PATENTS 835,751  5/1960  Great Britain.

OSCAR R. VERTIZ, *Primary Examiner.*

B. LEVENSON, *Assistant Examiner.*